United States Patent
Kardos et al.

(10) Patent No.: US 8,590,599 B2
(45) Date of Patent: Nov. 26, 2013

(54) COOLER ARRANGEMENT

(75) Inventors: Zoltan Kardos, Södertälje (SE); Henrik Nyren, Södertälje (SE)

(73) Assignee: Scania CV AB (publ) (SE)

( * ) Notice: Subject to any disclaimer, the term of this patent is extended or adjusted under 35 U.S.C. 154(b) by 1163 days.

(21) Appl. No.: 11/915,019

(22) PCT Filed: Jun. 16, 2006

(86) PCT No.: PCT/SE2006/050199
§ 371 (c)(1),
(2), (4) Date: Dec. 10, 2007

(87) PCT Pub. No.: WO2006/135335
PCT Pub. Date: Dec. 21, 2006

(65) Prior Publication Data
US 2008/0202725 A1    Aug. 28, 2008

(30) Foreign Application Priority Data
Jun. 17, 2005 (SE) .................................... 0501403

(51) Int. Cl.
*F02B 29/04* (2006.01)
(52) U.S. Cl.
USPC ............... 165/41; 165/51; 165/140; 165/139; 123/568.12; 123/563; 123/41.45; 60/599; 60/320; 60/321; 60/605.2; 138/37
(58) Field of Classification Search
USPC ............ 60/599, 320, 321, 605.2; 123/568.12, 123/563, 41.45; 165/41, 51, 140, 139; 138/37
See application file for complete search history.

(56) References Cited

U.S. PATENT DOCUMENTS 253,908 A * 2/1882 Brady ............................. 138/37

(Continued)

FOREIGN PATENT DOCUMENTS

| DE | 198 53 455 | | 6/1999 |
| DE | 198 53 455 | A1 | 6/1999 |
| DE | 19853455 | A1 * | 6/1999 |
| FR | 2856746 | A1 * | 12/2004 |
| WO | WO 2005/001271 | | 1/2005 |
| WO | WO 2005/001272 | | 1/2005 |

OTHER PUBLICATIONS

PCT International Search Report dated Oct. 3, 2006 issued in corresponding PCT International Appln. PCT/SE2006/050199.

*Primary Examiner* — John Ford
(74) *Attorney, Agent, or Firm* — Ostrolenk Faber LLP

(57) ABSTRACT

A cooler arrangement comprising a charge air cooler which comprises at least one first pipeline for guiding compressed air during cooling and a tank which receives the cooled compressed air via an outlet aperture from the first pipeline, and an EGR cooler which comprises at least one second pipeline for guiding exhaust gases during cooling and a tank which receives the cooled exhaust gases from an outlet aperture of the second pipeline. The cooler arrangement comprises a tubular element extending from the EGR cooler's tank to the charge air cooler's tank. The tubular element has an outlet aperture for exhaust gases which is situated downstream of the most downstream outlet aperture in the charge air cooler's tank with respect to the main direction of flow of the air in the tank.

13 Claims, 2 Drawing Sheets

(56) References Cited

U.S. PATENT DOCUMENTS

| | | | | |
|---|---|---|---|---|
| 774,752 | A | * | 11/1904 | Hart ............................ 123/41.45 |
| 1,139,289 | A | * | 5/1915 | Jacobs ........................ 123/41.45 |
| 1,183,303 | A | * | 5/1916 | La Porte ..................... 123/41.45 |
| 5,538,079 | A | * | 7/1996 | Pawlick ......................... 165/153 |
| 6,513,507 | B2 | * | 2/2003 | Balekai et al. ............ 123/568.12 |
| 6,666,264 | B2 | * | 12/2003 | Berning ........................ 165/173 |

\* cited by examiner

COOLER ARRANGEMENT

CROSS REFERENCE TO RELATED APPLICATION

The present application is a 35 U.S.C. §§371 national phase conversion of PCT/SE2006/050199, filed 16 Jun. 2006, which claims priority of Swedish Application No. 0501403-0, filed 17 Jun. 2005. The PCT International Application was published in the English language.

BACKGROUND TO THE INVENTION, AND STATE OF THE ART

The present invention relates to a cooler arrangement for a combustion engine and particulary to separaying cooled exhaust gases and gases cooled in a charge air cooler.

The amount of air which can be supplied to a supercharged combustion engine depends on the pressure of the air but also on the temperature of the air. Supplying the largest possible amount of air to the combustion engine therefore entails cooling the compressed air in a charge air cooler before it is led to the combustion engine. The compressed air is usually cooled by ambient air flowing through the charge air cooler. The compressed air can thus be cooled to a temperature substantially corresponding to the temperature of the surroundings.

The technique known as EGR (Exhaust Gas Recirculation) is a known way of leading part of the exhaust gases from a combustion process in a combustion engine back, via a return line, to an inlet line for supply of air to the combustion engine. A mixture of air and exhaust gases is thus supplied via the inlet line to the engine's cylinders in which the combustion takes place. The addition of exhaust gases to the air causes a lower combustion temperature resulting inter alia in a reduced content of nitrogen oxides $NO_x$ in the exhaust gases. This technique is used for both Otto engines and diesel engines. A known practice is to cool the returned exhaust gases in a first EGR cooler by means of the coolant of the vehicle's cooling system and in a second EGR cooler by means of ambient air. The exhaust gases can thus likewise be cooled to a temperature substantially corresponding to the temperature of the surroundings. A further known practice is to arrange the charge air cooler and the second EGR cooler close to one another at a front portion of a vehicle in front of the vehicle's ordinary radiator. The cooled exhaust gases and the cooled compressed air can thus be mixed with one another substantially immediately after the cooling.

In operating situations where the combustion engine's load is low while at the same time there is a low ambient temperature, there is risk of the exhaust gases being cooled to such a low temperature that corrosive substances in the exhaust gases may condense during cooling in the EGR cooler. EGR coolers are usually made of corrosion-resistant material such as stainless steel so that no problems are caused, at least during short periods, by the formation of such condensate in the EGR cooler. Charge air coolers, however, are usually made of material such as aluminium which has good heat-conducting characteristics but less good corrosion-resistant characteristics. As the charge air cooler and the EGR cooler are in this case situated close to one another, there is risk of exhaust gases or condensate from the exhaust gases making their way into and accumulating in the charge air cooler, which is not made of a totally corrosive-resistant material.

SUMMARY OF THE INVENTION

The object of the present invention is to provide a cooler arrangement which comprises an EGR cooler for cooling of returned exhaust gases and a charge air cooler for cooling of compressed air which are fitted close to one another and whereby the cooled exhaust gases from the EGR cooler or condensate from the exhaust gases are effectively prevented from making their way into and accumulating in the charge air cooler. This object is achieved with the cooler device of the invention. By means of a tubular element the cooled exhaust gases can be led into a charge air cooler's tank at a position downstream of the point where cooled air is led into the cooler's tank. The air flow present in the cooler's tank thus effectively prevents the exhaust gases from moving in an opposite direction and making their way into the charge air cooler's pipelines or accumulating in an upstream portion of the charge air cooler's tank. Since the exhaust gases are thus prevented from accumulating in the charge air cooler, it is therefore possible for the charge air cooler to be made of a less corrosion-resistant material than the EGR cooler. The returned exhaust gases and the compressed air thus already undergo mixing in a downstream portion of the charge air cooler's tank. The inlet line to the combustion engine can therefore be made rather short.

According to a preferred embodiment of the present invention, the tubular element has an extent inside the charge air cooler's tank. There is thus no need for any external lines to lead the cooled exhaust gases from the EGR cooler's tank to the charge air cooler's tank. Alternatively, the tubular element might have an extent at least partly outside the charge air cooler's tank. With advantage, the tubular element has a substantially rectilinear extent inside the first tank. The length of the tubular element can thus be minimised. The tubular element is preferably made of a substantially rigid material. This makes it easier to fit the tubular element in a correct position inside the charge air cooler's tank. The tubular element may have a substantially central extent inside the first tank. The result is a substantially uniform flow of air round the tubular element and its outlet aperture. The risk that any of the exhaust gases from the outlet aperture might be led in an opposite direction is thus eliminated. Central positioning of the tubular element's outlet aperture in the charge air cooler's tank results in effective mixing of exhaust gases and compressed air.

According to a preferred embodiment of the present invention, the charge air cooler's tank has at least one curved portion and the tubular element's outlet aperture is arranged in said curved portion. In a curved portion there is usually a more turbulent flow than in a straight portion. The result is that when the exhaust gases have left the tubular element they undergo effective mixing with the surrounding compressed air, starting in the curved portion. The tubular element's outlet aperture may be defined by an end surface angled in such a way that a radially outermost part of the end surface in the curved portion is situated downstream of a radially innermost part of the end surface. The tubular element is thus provided with an outlet aperture so directed as to facilitate the flow of exhaust gases through the curved portion. Said end surface may have an extent along an inclined plane.

According to a preferred embodiment of the present invention, the charge air cooler's tank is fitted above the EGR cooler's tank. This makes it possible to arrange a tubular element which has an extent from an upper portion of the EGR cooler's tank substantially directly into the charge air cooler's tank via an aperture in a lower portion of the charge air cooler's tank. In such cases, the tubular element will be of substantially vertical extent. Any condensate from the cooled exhaust gases which precipitates on the tubular element's internal wall surfaces will thus run down and accumulate in the EGR cooler's tank.

According to a preferred embodiment of the present invention, the tubular element is made of stainless steel. As there is risk of condensate from the cooled exhaust gases precipitating inside the tubular element, the tubular element needs to be made of a corrosion-resistant material. Stainless steel is a very corrosion-resistant material while at the same time having relatively good heat transfer characteristics. The EGR cooler is also preferably mainly made of stainless steel. In the EGR cooler there is always risk of condensate from the cooled exhaust gases precipitating, e.g. when the ambient air is at a low temperature and the engine is at low load. As stainless steel has the characteristics indicated above, it is advantageous for EGR coolers to be made of this material. With advantage, the charge air cooler will mainly be made of aluminium. The compressed air does not contain the same corrosive substances as the exhaust gases. The first cooler element can therefore with advantage be made of aluminium, which has extraordinary heat transfer characteristics and is a less expensive material than stainless steel.

BRIEF DESCRIPTION OF THE DRAWINGS

Preferred embodiments of the invention are described below by way of examples with reference to the attached drawings, in which.

DETAILED DESCRIPTION OD A PREFERRED EMBODIMENT OF THE INVENTION

Figure 1:
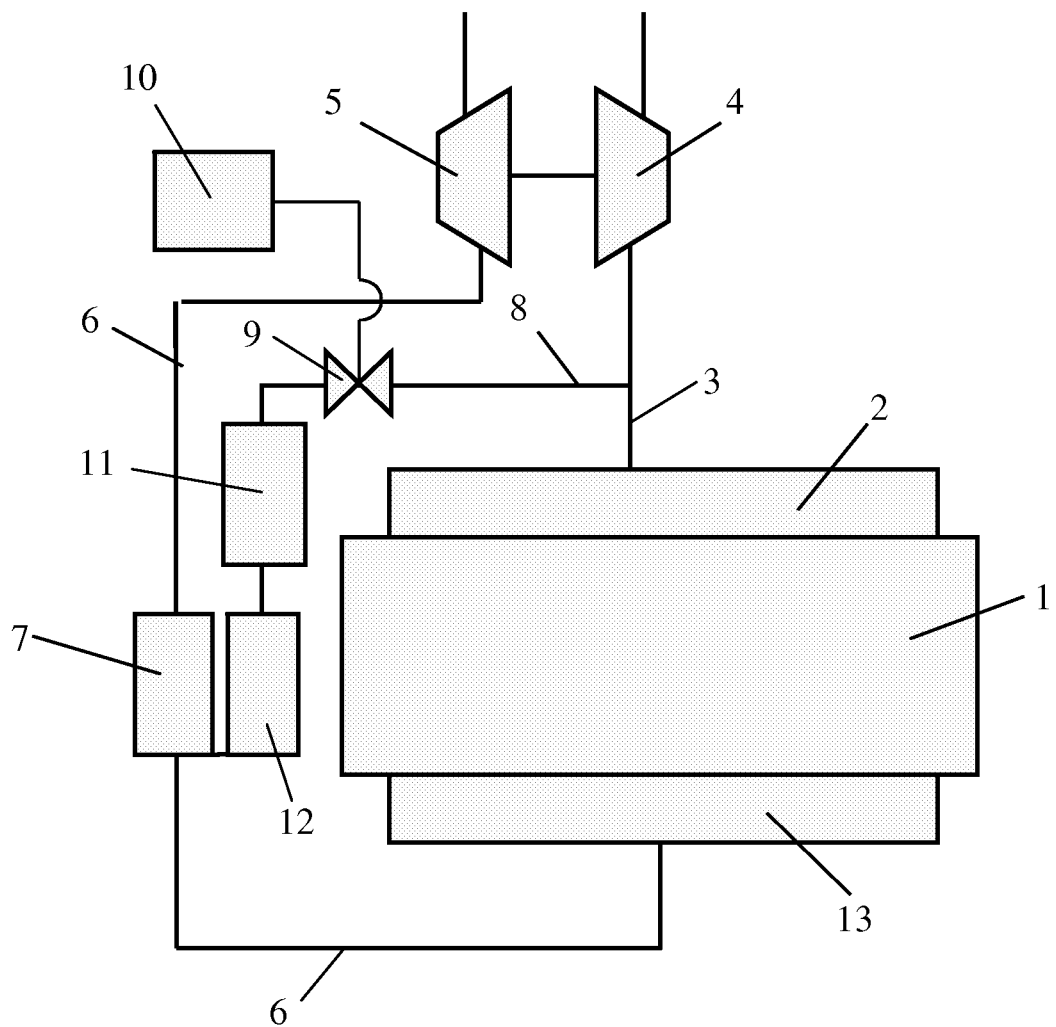
FIG. 1 depicts schematically a system for recirculation of the exhaust gases of a supercharged combustion engine and FIG. 2 depicts a cooler arrangement according to the present invention.

FIG. 1 depicts schematically an arrangement for recirculation of exhaust gases of a supercharged combustion engine. The combustion engine 1 may be an Otto engine or a diesel engine. Such recirculation of exhaust gases is called EGR (Exhaust Gas Recirculation). Adding exhaust gases to the compressed air which is led to the engine's cylinders lowers the combustion temperature and hence also the content of nitrogen oxides ($NO_x$) formed during the combustion processes. The combustion engine 1 may for example be intended to power a heavy vehicle. The exhaust gases from the cylinders of the combustion engine 1 are led via an exhaust manifold 2 to an exhaust line 3. The exhaust gases in the exhaust line 3, which are at above atmospheric pressure, are led to a turbine 4. The turbine 4 is thus provided with driving power which is transferred, via a connection, to a compressor 5. The compressor 5 compresses the air which is led to the combustion engine 1 via an inlet line 6. A charge air cooler 7 is arranged in the inlet line 6 to cool the compressed air before it is led to the combustion engine 1. The compressed air is cooled in the charge air cooler 7 by an air flow which is at the temperature of the surroundings.

A return line 8 is intended to effect recirculation of part of the exhaust gases from the exhaust line 3. The return line 8 comprises an EGR valve 9 by which the exhaust gas flow in the return line 8 can be shut off as necessary. The EGR valve 9 may be used for controlling the amount of exhaust gases led to the inlet line 6 via the return line 8. A control unit 10 is intended to control the EGR valve 9 on the basis of information about the current operating state of the combustion engine 1. The control unit 10 may be a computer unit provided with suitable software. The return line 8 comprises a first EGR cooler 11 in which the exhaust gases are cooled, as a first step, by a coolant of the combustion engine's cooling system. The return line 8 also comprises a second EGR cooler 12 for cooling the exhaust gases, as a second step. The exhaust gases are cooled in the second EGR cooler 12 by ambient air. The exhaust gases can thus be cooled to a temperature only a few degrees above the temperature of the surroundings.

The charge air cooler 7 and the second EGR cooler 12 are fitted close to one another. They are with advantage fitted at a front portion of the vehicle in front of the vehicle's undepicted ordinary radiator for cooling the combustion engine 1. The cooled compressed air from the charge air cooler 7 and the cooled exhaust gases from the second EGR cooler 12 mix and are led into the inlet aperture 6. The mixture of exhaust gases and air is led via a manifold 13 to the respective cylinders of the combustion engine 1.

During operation of the combustion engine 1, the exhaust gases in the exhaust line 3 drive the turbine 4. The turbine 4 is thurs provided with driving power which drives a compressor 5. The compressor 5 thus draws air into the inlet line 6 and compresses it. In most operating states of the combustion engine 1, the control unit 10 keeps the EGR valve 9 open so that part of the exhaust gases in the exhaust line 3 is led into the return line 8. At this stage the exhaust gases are at a temperature of about 600-700° C. When the exhaust gases in the return line 8 reach the EGR cooler 11, they undergo cooling, as a first step, by the coolant of the cooling system which cools the combustion engine 1. The exhaust gases undergo here their main temperature decrease. However, the EGR cooler 11 is subject to the limitation that it can at best only cool the exhaust gases to a temperature substantially corresponding to the temperature of the coolant. The temperature of the coolant in the cooling system may vary but in normal operation is usually within the range 80-100° C. The amount of compressed air and exhaust gases which can be supplied to the diesel engine 1 depends on the pressure of the air and exhaust gases but also their temperature. It is therefore important to provide substantially optimum cooling of the recirculating exhaust gases. The exhaust gases are therefore led into the second EGR cooler 12, in which they are cooled by ambient air. Using ambient air as cooling medium makes it possible to cool the exhaust gases down to a temperature close to that of the surrounding air. Exhaust gases can thus be cooled in the second EGR cooler 12 to substantially the same temperature as the compressed air in the charge air cooler 7.

Figure 2:
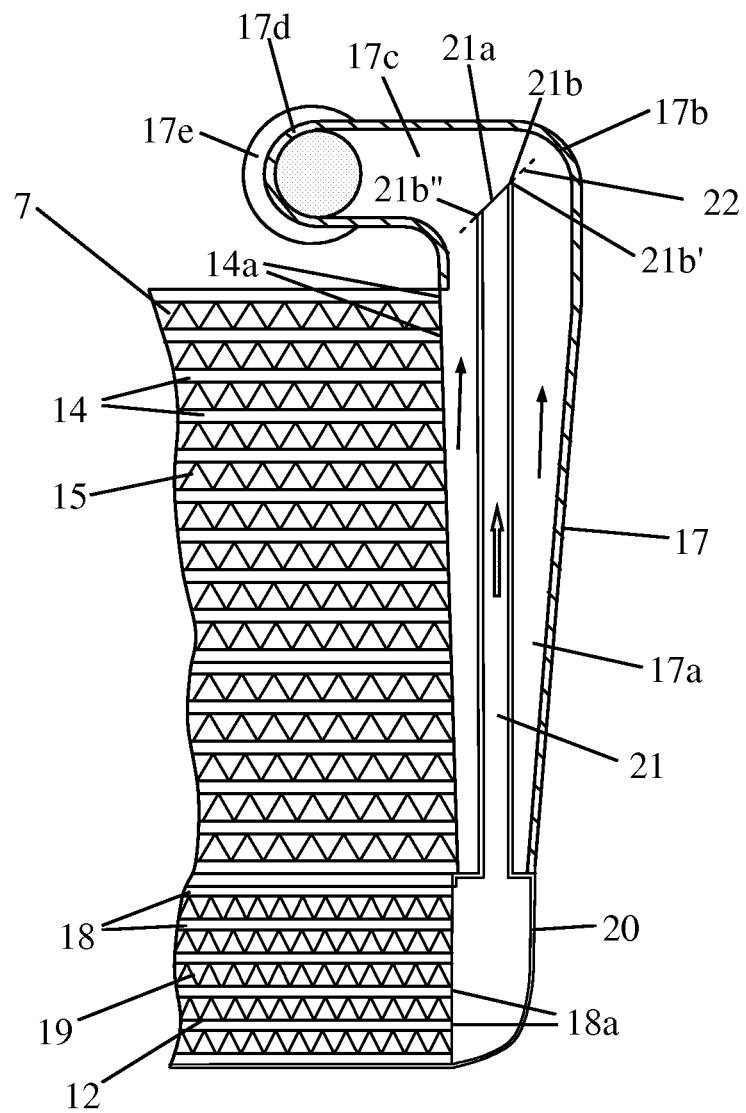

FIG. 2 depicts a section of part of the charge air cooler 7 and the second EGR cooler 12, which are thus fitted close to one another. The charge air cooler 7 comprises a plurality of parallel pipelines 14 which are intended to guide compressed air. Cooling flanges 15 are arranged in the gaps between the pipelines 14. Air at the temperature of the surroundings is adapted to circulate through the gaps between the pipelines 14 so that the compressed air inside the pipelines 14 undergoes cooling by the surrounding air. The pipelines 14 and the cooling flanges 15 together constitute a substantially platform-like cooler portion of the charge air cooler 7. The pipelines 14 have outlet apertures 14a which lead at different levels into a tank 17 of the charge air cooler which is fastened to an end portion of the platform-like cooler portion. The function of the tank 17 is to receive cooled compressed air from the pipelines 14. The tank 17 has a base portion 17a for receiving compressed air from the pipelines' outlet apertures 14a. The tank 17 has a first curved portion 17b at an upper end of the base portion 17a. The first curved portion 17b is followed by a relatively short substantially horizontal portion 17c and a second curved portion 17d. The charge air cooler's tank 17 ends with a connecting portion 17e for connecting an inlet line 6 to the tank 17. The pipelines 14, the cooling flanges 15 and the tank 17 of the charge air cooler 7 are with advantage made of a material which has very good heat conducting characteristics, e.g. aluminium.

The second EGR cooler 12 is fitted substantially vertically below the charge air cooler 7. The second EGR cooler 12 comprises a plurality of parallel pipelines 18 which are intended to guide returned exhaust gases. Cooling flanges 19 are arranged in the spaces between the pipelines 18. Air at the temperature of the surroundings is adapted to circulate in the gaps between the pipelines 18 so that the exhaust gases in the pipelines 18 undergo cooling. The pipelines 18 and the cooling flanges 19 together constitute a substantially platform-like cooler portion of the second EGR cooler 12. The pipelines 18 have outlet apertures 18a which lead at different levels into a tank 20 of the second EGR cooler 12 which is adapted to receiving cooled exhaust gases. The pipelines 18 and the tank 20 are with advantage made of a very corrosion-resistant material, e.g. stainless steel. The material should also have relatively good heat conducting characteristics. The cooling flanges 19, however, may be made of a different material, since they are not in direct contact with the corrosive exhaust gases.

In a fitted state, the charge air cooler's tank 17 and the second EGR cooler's tank 20 are connected to one another. The second EGR cooler's tank 20 comprises at an upper portion a tubular element 21 which extends substantially vertically into the charge air cooler's tank 17. The function of the tubular element 21 is to lead exhaust gases from the second tank 20 to a suitable position in the first tank 17. The tubular element 21 extends in a rectilinear manner upwards in a substantially central position inside the first tank 17. The tubular element 21 has an outlet aperture 21a situated close to the first tank's first curved portion 17b. The outlet aperture 21a is situated at a higher level than the outlet apertures 14a of pipelines 14. The air leaving the outlet apertures 14a flows upwards in the base portion 17a of the tank 17 towards the first curved portion 17b of the tank 17. The outlet aperture 21a of tubular element 21 is thus situated at a position downstream of the outlet apertures 14a of pipelines 14 with respect to the main direction of flow of the air. The tubular element 21 has an upper edge surface 21 b which defines the outlet aperture 21a. The upper edge surface 21b is situated in a plane 22 which is inclined with respect to the horizontal part 17c of the tank 17. The part of the edge surface 21b' which is at a radially outer position in the curved portion 17b is thus situated at a greater height than a part of the edge surface 21 b" which is situated at a radially inner position in the curved portion 17b. Such a direction of the outlet aperture 21 a facilitates the flow of exhaust gases through the first curved portion 17b and the mixing of the exhaust gases with the compressed air in the tank's horizontal portion 17c.

The object of the tubular element 21 is to prevent corrosive substances from the exhaust gases accumulating in the charge air cooler 7, since the latter's components are usually made of a material which is not totally resistant to corrosive substances. Accordingly, the tubular element's outlet aperture 21a discharges at a level which is definitely higher than the outlet apertures 14a in the tank 17. The exhaust gases leaving the tubular element's outlet aperture 21awill thus be entrained by, and in the direction of flow, of the ambient air. The risk of exhaust gases accumulating in the charge air cooler's tubular element 14 and tank 17 is thus eliminated. When for example the combustion engine's load is low while at the same time there is a low ambient temperature, there is risk of the exhaust gases being cooled to such a low temperature that corrosive substances in the exhaust gases may condense. If the exhaust gases are cooled to such a temperature that condensate forms, this usually happens in the second EGR cooler's tubular element 18 or in the tank 20. If condensate forms inside the vertical tubular element 21, it will run downwards and accumulate at the bottom of the tank 20. As the second EGR cooler's tank 20 and the tubular element 21 are made of very corrosion-resistant material such as stainless steel, there is little risk from the corrosion point of view, at least over short periods, that corrosive substances might accumulate in the tank 20.

The invention is in no way limited to the embodiment described but may be varied freely within the scoped of the claims.

The invention claimed is:

1. A cooler arrangement for a combustion engine, the arrangement comprising:
   a charge air cooler configured to cool charge air before the charge air is delivered to the combustion engine, the charge air cooler comprising at least one first pipeline for guiding compressed air during cooling, the at least one first pipeline having at least one first outlet aperture, and a first tank positioned and operable to receive the cooled compressed air from the at least one first outlet aperture and to guide the cooled compressed air out of the first tank;
   an EGR cooler configured to cool the exhaust gases before the exhaust gases are delivered to the combustion engine, the EGR cooler comprising at least one second pipeline for guiding exhaust gases from the engine during cooling, the at least one second pipeline having at least one second outlet aperture, and a second tank positioned and operable to receive the cooled exhaust gases from the at least one second outlet aperture; and
   a tubular element extending vertically from the second tank to the first tank, the tubular element having a third outlet aperture for the exhaust gases, the third outlet aperture being situated downstream from the at least one first outlet aperture, downstream being defined as in a direction of flow of the cooled compressed air in the first tank,
   wherein the third outlet aperture is positioned inside the first tank such that the first tank guides the cooled compressed air around the third outlet aperture, and
   the first tank comprises a curved portion and a horizontal portion, the horizontal portion immediately following the curved portion in the downstream direction, and the third outlet aperture is in the curved portion.

2. A cooler arrangement according to claim 1, wherein the tubular element is positioned inside the first tank.

3. A cooler arrangement according to claim 2, wherein the tubular element is positioned centrally inside the first tank.

4. A cooler arrangement according to claim 1, wherein the tubular element has a substantially rectilinear extent inside the first tank.

5. A cooler arrangement according to claim 2, wherein the first tank is fitted above the second tank.

6. A cooler arrangement according to claim 1, wherein the tubular element is made of stainless steel.

7. A cooler arrangement according to claim 1, wherein the EGR cooler is mainly made of stainless steel.

8. A cooler arrangement according to claim 1, wherein the charge air cooler is mainly made of aluminum.

9. A cooler arrangement according to claim 1, wherein the first tank is fitted above the second tank.

10. A cooler arrangement according to claim 1, wherein the first tank guides the charge air in a first direction and the tubular element is positioned such that the tubular element has a longitudinal extent along the first direction inside the first tank.

11. A cooler arrangement for a combustion engine, the arrangement comprising:
a charge air cooler configured to cool charge air before the charge air is delivered to the combustion engine, the charge air cooler comprising at least one first pipeline for guiding compressed air during cooling, the at least one first pipeline having at least one first outlet aperture, and a first tank positioned and operable to receive the cooled compressed air from the at least one first outlet aperture and to guide the cooled compressed air out of the first tank;
an EGR cooler configured to cool the exhaust gases before the exhaust gases are delivered to the combustion engine, the EGR cooler comprising at least one second pipeline for guiding exhaust gases from the engine during cooling, the at least one second pipeline having at least one second outlet aperture, and a second tank positioned and operable to receive the cooled exhaust gases from the at least one second outlet aperture; and
a tubular element extending from the second tank to the first tank, the tubular element having a third outlet aperture for the exhaust gases, the third outlet aperture being situated downstream from the at least one first outlet aperture, downstream being defined as in a direction of flow of the cooled compressed air in the first tank,
wherein the third outlet aperture is positioned inside the first tank such that the first tank guides the cooled compressed air around the third outlet aperture, the tubular element is positioned inside the first tank, the first tank comprises a curved portion and the third outlet aperture is in the curved portion, and
the third outlet aperture is defined by an end surface of the tubular element, and the end surface is inclined in the first curved portion such that a radially outermost part of the end surface in the first curved portion is situated downstream relative to a radially innermost part of the end surface.

12. A cooler arrangement for a combustion engine, the arrangement comprising:
a charge air cooler configured to cool charge air before the charge air is delivered to the combustion engine, the charge air cooler comprising at least one first pipeline for guiding compressed air during cooling, the at least one first pipeline having at least one first outlet aperture, and a first tank positioned and operable to receive the cooled compressed air from the at least one first outlet aperture and to guide the cooled compressed air out of the first tank;
an EGR cooler configured to cool the exhaust gases before the exhaust gases are delivered to the combustion engine, the EGR cooler comprising at least one second pipeline for guiding exhaust gases from the engine during cooling, the at least one second pipeline having at least one second outlet aperture, and a second tank positioned and operable to receive the cooled exhaust gases from the at least one second outlet aperture; and
a tubular element extending vertically from the second tank to the first tank, the tubular element having a third outlet aperture for the exhaust gases, the third outlet aperture being situated downstream from the at least one first outlet aperture, downstream being defined as in a direction of flow of the cooled compressed air in the first tank,
wherein the third outlet aperture is positioned inside the first tank such that the first tank guides the cooled compressed air around the third outlet aperture, and
the first tank comprises a curved portion and a horizontal portion, the horizontal portion immediately following the curved portion in the downstream direction, and the third outlet aperture is in the curved portion, the horizontal portion extending in a direction parallel to a direction in which the at least one first pipeline extends.

13. A cooler arrangement for a combustion engine, the arrangement comprising:
a charge air cooler configured to cool charge air before the charge air is delivered to the combustion engine, the charge air cooler comprising at least one first pipeline for guiding compressed air during cooling, the at least one first pipeline having at least one first outlet aperture, and a first tank positioned and operable to receive the cooled compressed air from the at least one first outlet aperture and to guide the cooled compressed air out of the first tank;
an EGR cooler configured to cool the exhaust gases before the exhaust gases are delivered to the combustion engine, the EGR cooler comprising at least one second pipeline for guiding exhaust gases from the engine during cooling, the at least one second pipeline having at least one second outlet aperture, and a second tank positioned and operable to receive the cooled exhaust gases from the at least one second outlet aperture; and
a tubular element extending vertically from the second tank to the first tank, the tubular element having a third outlet aperture for the exhaust gases, the third outlet aperture being situated downstream from the at least one first outlet aperture, downstream being defined as in a direction of flow of the cooled compressed air in the first tank,
wherein the third outlet aperture is positioned inside the first tank such that the first tank guides the cooled compressed air around the third outlet aperture, and
the first tank comprises a vertical portion, a curved portion, and a horizontal portion, the curved portion immediately following the vertical portion in the downstream direction, the horizontal portion immediately following the curved portion in the downstream direction, and the third outlet aperture is in the curved portion.

* * * * *